United States Patent [19]

Borer

[11] Patent Number: 6,069,670
[45] Date of Patent: May 30, 2000

[54] MOTION COMPENSATED FILTERING

[75] Inventor: Timothy Borer, Smallfield, United Kingdom

[73] Assignee: Innovision Limited, Woking, United Kingdom

[21] Appl. No.: 08/945,514

[22] PCT Filed: May 1, 1996

[86] PCT No.: PCT/GB96/01051

§ 371 Date: Oct. 24, 1997

§ 102(e) Date: Oct. 24, 1997

[87] PCT Pub. No.: WO96/35294

PCT Pub. Date: Nov. 7, 1996

[30] Foreign Application Priority Data

May 2, 1995 [GB] United Kingdom .................... 9508928

[51] Int. Cl.$^7$ ...................................................... H04N 7/26
[52] U.S. Cl. ......................... 348/620; 348/416; 348/443; 348/699; 708/313
[58] Field of Search ..................................... 348/699, 416, 348/443, 620; 708/313; H04N 7/26

[56] References Cited

U.S. PATENT DOCUMENTS

| | | | |
|---|---|---|---|
| 4,862,266 | 8/1989 | Gillard | 348/443 |
| 4,862,267 | 8/1989 | Gillard | 348/416 |
| 5,335,194 | 8/1994 | Clayton | 708/313 |

FOREIGN PATENT DOCUMENTS

| | | | |
|---|---|---|---|
| 0 294 958 A2 | 12/1988 | European Pat. Off. | H04N 7/01 |
| 0 561 067 A2 | 9/1993 | European Pat. Off. | H04N 7/01 |

OTHER PUBLICATIONS

"Signal Processing of HDTV", edited by L. Chiariglione. Proceeding of the Second International Workshop on Signal Processing of HDVT. L'Aquila, Italy, Feb. 29–Mar. 2, 1998.

"Motion Compensated Subsampling of HDTV", by R.A.F. Belfor, R.L. Lagendijk, and J. Biemond. SPIE Proceedings, vol. 1605. Visual Communications and Image Processing '91: Visual Communication, pp. 274–284, Nov. 11, 1991.

"Motion Compensated Field Interpolation Using A Hierarchically Structured Displacement Estimator", by Matthias Bierling and Robert Thoma. Signal Processing, vol. 11, No. 4, Dec., 1986, pp. 387–404.

"Television Standards Conversion", by Timothy Borer. A thesis submitted for the degree of Doctor of Philosophy. Supervised by Josef Kittler, Department of Electronic and Electrical Engineering, University of Surrey, Guilford, Surrey GU2 5XH, U.K., and Ian Childs, Research Dept., British Broadcasting Corporation, Kingswood Warren, Tadworth, Surrey, KT20 6NP, U.K.

"Motion Compensated Display Field Rate Upconversion", by T.J. Borer, M.G. Huyler & D.W. Parker. International Broadcasting Convention, Birghten, UK. Sep. 21–25, 1990.

"Pre and Post–Processing in a Video Terminal Using Motion Vectors" by L. Chiariglione, L. Corgnier, M. Guglielmo. Centro Studi e Laboratori Telecomunicazioni, Italy.

(List continued on next page.)

*Primary Examiner*—Howard Britton
*Attorney, Agent, or Firm*—Ratner & Prestia

[57] ABSTRACT

A video processing method and system for motion compensated filtering of interlaced television signals comprising a motion estimation device for producing motion vectors corresponding to each output sampling site, a vector processor generating a set of input coordinates for each output sampling site depending on its corresponding motion vector, a data store in memory for storing input pixel values and providing a variable delay, a plurality of multipliers and corresponding coefficient stores, and an adder to sum the partial result from each multiplier, the multipliers multiply an input pixel value, selected from the data store depending on part of the input coordinate, by a coefficient selected from the coefficient store depending on another part of the input coordinate, the filter aperture (set of filter coefficients) is selected depending on the vertical velocity component of the motion vector supplied by the motion estimation device.

10 Claims, 3 Drawing Sheets

OTHER PUBLICATIONS

"Digital Standards Conversion: interpolation theory and aperture systhesis" by C.K.P. Clarke, A.C.G.I. & N.E. Tanton.Research Department, Engineering Division, British Broadcasting Corporation, Dec. 1984.

"Review of Techniques for Motion Estimation and Motion Compensation" by Eric Dubois & Janusz Konrad. 4th Int'l Colloquium on Advanced Television Systems, Ottawa, Canada, Jun. 25–29, 1990.

"Motion–compensating Field Interpolation from Interlaced and Non–interlaced Grids" by B.Girod & R. Thoma 2nd Int'l Technical Symposium on Optical & Electro–Optical Applied Science & Engineering: Image Processing Symposium, Cannes, Dec., 1985.

"Motion Compensated Interpolation" by Elena Marcozzi & Stefano Tubaro. SPIE vol. 804, Advances in Image Processing (1987). pp. 61–68.

"Standards Conversion Using Motion Compensation" by Thomas Reuter. Signal Processing, vol. 16 (1989) pp. 73–82.

"Generation of High Quality Slow–Motion Replay Using Motion Compensation" by G.A. Thomas & H.Y.K. Lau. International Broadcasting Convention, Sep. 21–25, 1990. British Broadcasting Corp. U.K.

"Motion Compensated Interpolation Considering Covered and Uncovered Background" by Robert Thoma & Matthias Bierling. Signal Processing: Image Communication, vol. 1, No. 2, Oct., 1989.

"Television Motion Measurement for DATV and Other Applications" by G.A. Thomas. Research Department Report, Sep., 1987. The British Broadcasting Corp.

"Distorting the Time Axis: Motion Compensated Image Processing in the Studio" by G.A. Thomas. BBC Research Dept. International Broadcasting Convention, Brighton, UK, Sep. 23–27, 1988.

"Review of Motion Analysis Techniques" by J.F. Vega–Riveros & K. Jabbour. IEE Proceedings, vol. 136, Pt. 1, No. 6, Dec., 1989.pp. 397–404.-

MOTION COMPENSATED FILTERING

This invention relates to improved motion compensated filtering or interpolation of interlaced signals and in particular video sequences such as television pictures, with application in all areas where interlaced video sequences are processed using motion vectors, including but not limited to:

i. video compression
   ii. video to film conversion
   iii. motion compensated colour decoding
   iv. video motion estimation
   v. television standards conversion
   vi. slow motion display In this application the term video sequence refers to an image sequence sampled in an interlaced fashion. An image may be a multi-dimensional representation of some property-typically, but not necessarily brightness-of a scene; thus a moving image is a temporal and spatial representation of a property of a scene and an image sequence is a moving image sampled at specific instants. The instant at which a point in the moving image is sampled may depend on the spatial location of that point. A pixel is a sample of an image having a value corresponding to some property of the scene which the image represents and corresponding to a specific image co-ordinate. The image co-ordinate, a specification of the location of a point in an image, need not correspond to a point at which a sampled image has been sampled. Hence image co-ordinates, input and output, are not necessarily quantised. A sampling site is the image co-ordinate of a pixel in a sampled image.

Conventional motion compensated filtering or interpolation is described in detail in references 2, 3, 4, 5, 10, 12, 13, 14, 16, 17, 18 & 20 listed in appendix 1. This process will henceforth be referred to as MCF, or conventional MCF, which will be assumed to include the process of interpolation as well as filtering.

The hardware implementation of a conventional motion compensated filter/interpolator is described in references 3, 4, 18 & 20. One simple implementation is as a cascade of filter/interpolation cells or taps as described in reference 3 and illustrated in FIG. 1.

FIG. 1 shows a conventional MCF filter cell having a vector processor 1 which converts the motion vectors for each output sampling site in an output image into the input coordinates of an input image used in the filtering or interpolation operation.

The vector processor receives the output sampling site, generated by counters as described in the references, and the associated motion vector from motion estimator hardware, described in the references, and searches through consecutive fields to find the correct input co-ordinate corresponding to the output sampling site concerned.

The motion estimator is a device for estimating the motion vectors corresponding to a moving image. The estimated motion vectors can be sampled on either the input or output sampling lattices for an image processing system. For MCF input and output sampling lattices are usually, identical. For motion compensated interpolation, the estimated motion vectors should be sampled on the output sampling lattice.

The input coordinate depends on the output sampling site, the motion vector, and the location of the filter tap within the filter aperture. A variable delay 2 supplies a multiplier 3 with the correct input pixel value, from an input image to an image processing system, for the current output sampling site which is determined by the integer part of the current input coordinate. The multiplier 3 multiplies the value of the pixel by a pre-calculated coefficient held in a look up table 4 stored in ROM. The coefficient is determined by the required filter characteristics and the sub-pixel, or fractional, part of the input coordinate supplied by the vector processor as shown in FIG. 1.

The term filture aperture in this document refers to the impulse response of the filter. The apertue is distinct from the filter's region of support which describes the number and spatio-temporal distribution of the filter taps. A typical motion compensated transversal filter/interpolator, such as that used for television standards conversion, might have an aperture spanning four fields, 4 field lines on each field and 2 pixels on each field line. Field line spacing is twice the picture line spacing which is the distance between vertically consecutive lines in a vertically sampled image. Vertically consecutive picture lines need not be sampled at the same temporal instant. For an interlaced video sequence, vertically consecutive picture lines will be on temporally adjacent fields. Such a filter would, therefore, require 32 interpolation/filter cells cascaded together. In one possible implementation the variable delay 2 could be implemented using dual port RAM (random access memory). By making the dual port RAM able to store 4 complete fields, any point in the filter aperture is accessible from the variable delay 2. A delay is implemented by providing offset read and write addresses as described in reference 3, page 179. The specific delay implemented for a given output pixel depends on the integer part of the corresponding input coordinate for that pixel. The multiplier coefficients used are stored, as a lookup table, in ROM (read only memory). The specific coefficient to be used is selected from the complete filter aperture by the fractional part of the corresponding input coordinate. In this example each coefficient lookup table would contain 1/32nd part of the complete filter /interpolation aperture. In other implementations the coefficient lookup tables might contain the complete aperture-set of coefficients (reference 3). For convenience the coefficient lookup table could be combined with the multiplier in a look-up table, implemented in ROM as shown in reference 4.

The size of the filter/interpolation coefficient lookup table 4, for a conventional motion compensated filter, is determined by the size of the filter aperture and the precision of motion vectors supplied to the filter. Consider, for example, the standards conversion interpolator described above assuming a vector precision of 1/16 picture line spacing or horizontal pixel spacing per field. The size of the coefficient lookup tables is calculated as shown below. The number of spatial phases corresponds to the spatial precision of the motion vectors. The number of temporal phases determines the temporal precision of the interpolation (see references 3, 6 & 7), typically there are 16 temporal phases for a commercial standards converter.

Horizontally 2 taps 16 phases=5 bits

Vertically 4 field lines and 16 phases=8 picture lines and 16 phases=7 bits

Temporally 4 fields and 16 phases=6 bits

TOTAL=18 bits

In this example the total coefficient lookup table size has an address space of 18 bits. The lookup table is partitioned into 32 separate smaller lookup tables, one for each interoolation cell, hence the size of each lookup table is only 13 bits. In other implementations the coefficient lookup table might have to contain the complete aperture. The difference between a motion compensated filter and interpolator is simply that a filter only has a single temporal phase whereas an interpolator has multiple temporal phases. Typically a filter will generate an output temporally co-sited with the input fields. Multiple phase, or polyphase filters are described in detail in reference 8.

It is highly desirable to prevent aliasing in video processing as it is visually very disturbing. In conventional, spatio-temporal, MCF a single interpolation aperture, set of filter coefficients, is used. This process is unable to remove undesirable signal aliases due to the interlaced nature of the video signal. These unwanted aliases, present in the output of a conventional MCF, can significantly degrade the performance of a video processing system using MCF. The reason for this unwanted aliasing is that a single interpolation aperture is used for all motion speeds. Furthermore, the filter aperture is generally designed considering only the magnitude of the, spatio-temporal, signal spectrum ignoring phase.

Accordingly the invention provides a filter or interpolation device for processing video sequences comprising a plurality of filter cells characterised in that the filter cells implement between them a filter aperture which varies depending on the vertical velocity component of the motion vector associated with each sampling site, such that different filter apertures are used for different vertical velocities.

The invention also provides a system for motion compensated filtering of interlaced television signals comprising a motion estimation device for producing motion vectors corresponding to each output sampling site, a vector processor generating a set of input coordinates for each output sampling site depending on its corresponding motion vector, a data store in memory for storing input pixel values and providing a variable delay, a plurality of multipliers and corresponding coefficient stores, the multipliers multiply an input pixel value selected from the data store depending on a part of the input coordinate by a coefficient selected from the coefficient store depending on another part of the input coordinate, the filter aperture (set of filter coefficients) is selected depending on the vertical velocity component of a motion vector supplied by the motion estimation device, and an adder to sum the partial result from each multiplier.

The filter or interpolator may comprise a coefficient look-up table stored in memory, wherein the total number of different coefficient sets available is given by $2^{p+1}$ where p is the vertical vector precision in bits. The vertical vectors being measured ir. units of input picture lines/field period.

The invention also consists in a method for processing interlaced video signals which adapts the filter/interpolator aperture according to the phases of the signal and alias components of the spatial spectra of the input fields. The method is achieved by using a filter aperture which depends on the vertical velocity associated with each output sampling site. Different filter apertures are used for different velocities and the filter aperture used can vary between adjacent output sampling sites.

The method may comprise assigning a motion vector to each output sampling site, producing a set of input coordinates for each output sampling site, selecting a filter aperture, set of filter coefficients, from multiple pre-calculated filter apertures depending on the vertical part of each motion vector, selecting a coefficient from the filter aperture depending on the fractional part of each input coordinate, selecting an input pixel value depending on the integer part of each input coordinate, where input co-ordinates are measured in input picture lines per field period, and multiplying each input pixel value by the correspondingly selected coefficient to produce a partial result for each output sampling site and summing the partial results.

The number of filter apertures required is dependent on the precision of the vertical component of the motion vector.

Improved filtering is achieved by designing the filter's frequency response, based on the phase and magnitudes of the signal and alias components in the spatial spectra of input fields, in order to cancel the unwanted alias components leaving only the desired signal components.

This invention, by designing filter apertures as described above and detailed below and adapting the filter/interpolation aperture to the motion vector, enables a significant reduction of unwanted aliasing at the output of a motion compensated filter/interpolator. By considering the phase and magnitude of signal and alias components of consecutive spatial spectra it is possible, as described below, to design a filter aperture that substantially cancels aliasing which would otherwise be present in the output of a conventional MCF. To achieve this a different aperture is required for each different vertical motion speed. In practical terms this is achieved by selecting a different filter/interpolation aperture depending on vertical motion speed. Quantisation of the vertical motion vectors supplied to the motion compensated filter ensures that only a finite number of different filter apertures are required. This invention might, concisely, be described as vertical velocity adaptive motion compensation filtering (VAMCF).

The invention will now be described by way of example with reference to the accompanying drawings, in which.

In the method of the invention one of many different interpolation apertures is used for filtering depending on the vertical velocity component of a motion vector. With appropriate filter design, as described in appendix 2, the aliasing present in the interlaced input can be cancelled to produce an output substantially free from unwanted alias. In order to do this different interpolation apertures are required for different vertical motion speeds. The number of different filter apertures required depends on the vertical vector precision. Assuming the vertical motion speed is measured in picture lines/field period then the number of different coefficient sets required is given by: Sets=$2^{p+1}$ (where p is the vertical vector precision in bits).

So for vertical vectors measured to a precision of 1/16 picture line/field period $2^{4+1}$=32 different coefficient sets are required. The P+1 (5 in this example) bits required to address the coefficient sets are the fractional vertical vector bits plus the least significant integer vertical vector bit. VAMCF can therefore be implemented according to FIG. 2.

Figure 1:
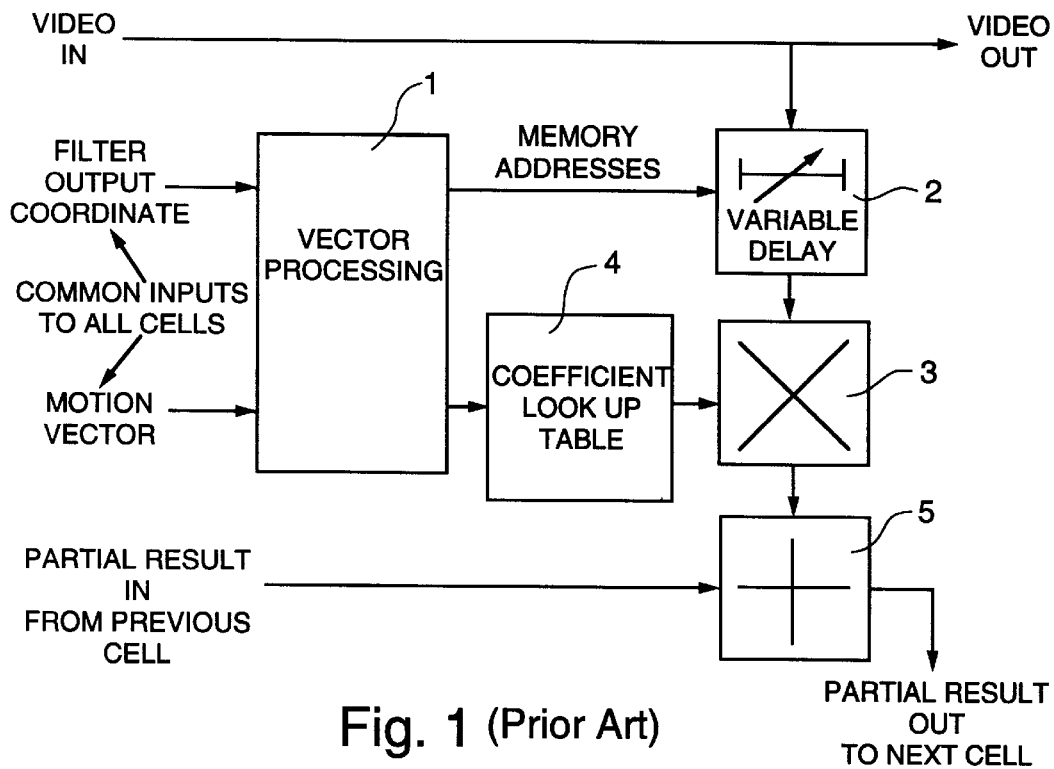
FIG. 1 is a block diagram of a motion compensation filter/interpolation cell according to a prior art implementation of motion compensated filtering.
Figure 2:
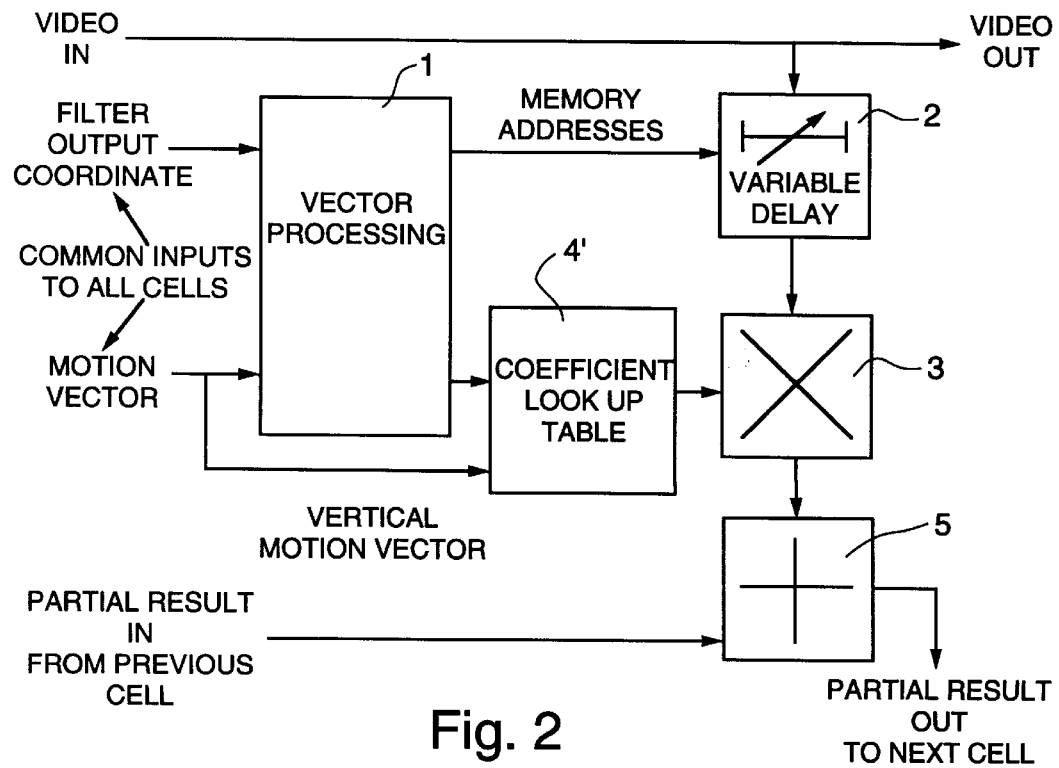
FIG. 2 is a block diagram of a VAMCF/ interpolation cell according to a first embodiment.

The filter cell shown in FIG. 2 differs from that shown in FIG. 1 described above in that the coefficient table 4' contains multiple filter apertures, sets of filter coefficients and is, therefore, considerably larger and the filter aperture is selected by the vertical velocity component of the motion vector.

To implement, in this example, VAMCF rather than MCF, the size of the coefficient lookup table would increase from a 13 bit address (see above) to an 18 bit address. In an implementation which requires all the coefficients from all apertures to be stored in a single lookup table the address space would increase from 18 to 23 bits. In either case this is a significant increase in the size of lookup cable required.

For VAMCF there may be an advantage to combining the vertical parts of the vector processing and the coefficient lookup table. This may reduce the size of lookup table required because the vertical part of the coefficient address and the aperture, coefficient set, address contain redundant information. Given the vertical motion speed and the temporal coefficient address, both the vertical coefficient address and the aperture, coefficient set, address can be found. This results in the implementation of FIG. 3.

Figure 3:
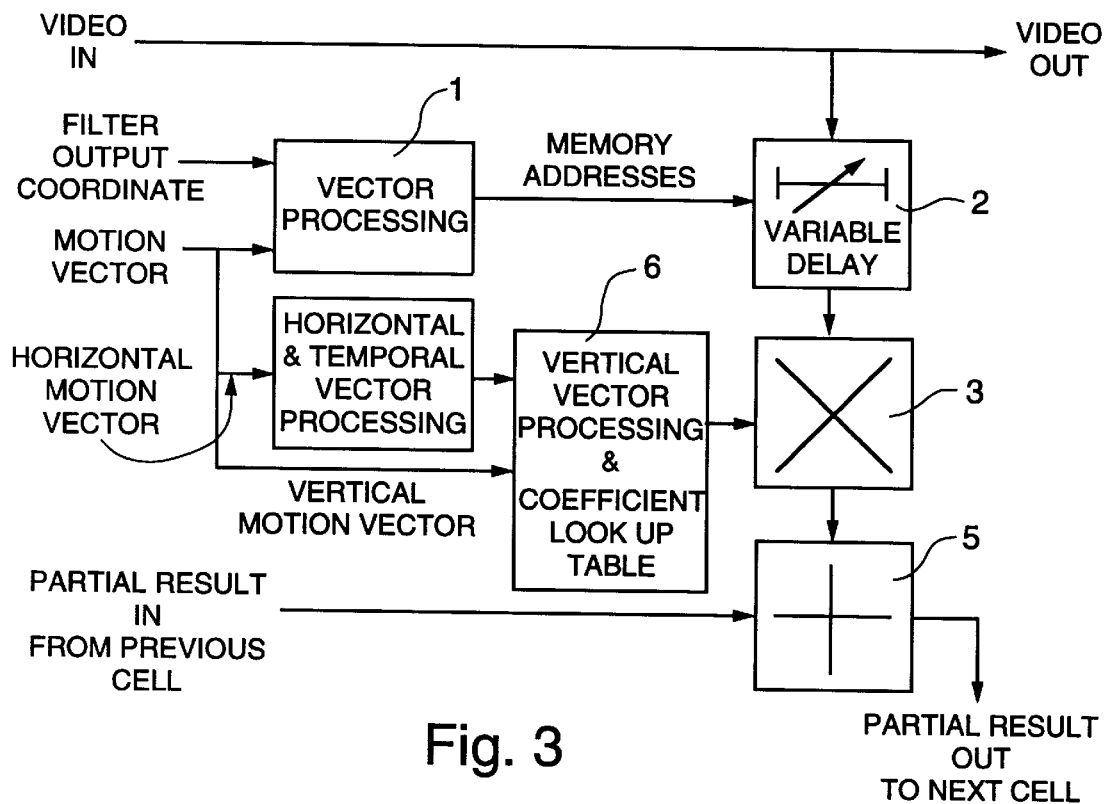
FIG. 3 is a block diagram of an alternative VAMCF/ interpolation cell according to another embodiment.

The best implementation of FIG. 2 or FIG. 3 depends on the vertical aperture size and the maximum vertical velocity. The size of the look up table 7, implemented in ROM for FIG. 3, assuming a maximum vertical vector of ±32 pixels (ie. picture lines)/field period, is given by, in this example;

Horizontal: 2 taps, 16 phases=5 bits

Temporal: 4 fields, 16 phases=7 bits

Vertical: +−32 picture lines/field, precision 1/16=9bits

TOTAL=21 bits which is 2 bits less than the implementation of FIG. 2.

The filter cells shown in FIGS. 2 and 3 contain modifications to the conventional motion compensated filter, shown in FIG. 1, which result in motion compensated filters/interpolators that adapt to vertical motion speed to cancel aliasing. The use of different interpolation apertures for different vertical velocities allows aliasing inherent in interlaced television signals to be cancelled, thereby preventing degradation of the output of motion compensated filtering/interpolation systems.

VAMCF requires a minimum filter aperture spanning at least 2 fields but better results can be achieved, as indicated in appendix 2, by using more than two fields.

EXAMPLE 1

Interlace to Progressive Conversion for Video Compression

Many video compression systems (e.g. JPEG, MPEG, sub-band coding, wavelet transform schemes) perform better with progressive rather than interlaced pictures. Many video sources, however, produce interlaced rather than progressively scanned video. Hence to get the best out of compression systems requires the conversion of interlaced video to a progressive format. Existing interlace to progressive converters, be they a fixed filter, motion adaptive, or motion compensated, are unable to perform this conversion without leaving considerable aliasing in the progressive output. This aliasing can significantly degrade the performance of the video compression system.

Figure 4:
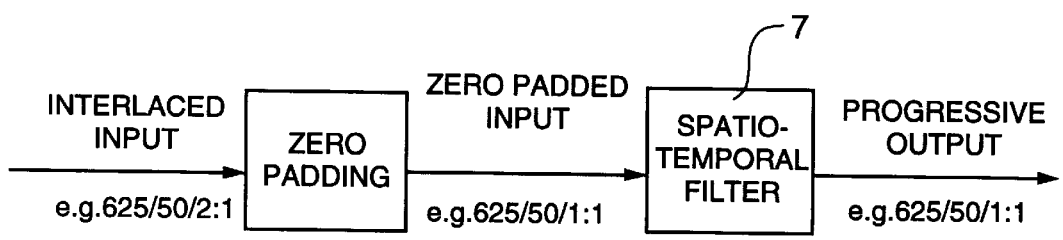
FIG. 4 is a block diagram of a method of interlace co progressive conversion.

Using the improved motion compensated filtering of this invention, the quality of the interlace to progressive conversion can be significantly improved by reducing the unwanted aliasing in the progressive signal. This, in turn, allows improved quality or a reduced bit rate from the compression system. An interlace to progressive converter is, conceptually, a filter as illustrated in FIG. 4.

The interlaced input is first padded with zeros as is described in many texts on digital signal processing, to create a highly aliased progressive signal. The zero padded signal is then filtered to remove as much aliasing as possible. The filter 7 can be a fixed linear filter, motion adaptive filter, non-linear, for example median filter, or a conventional motion compensated filter. If an alias cancelling motion compensated filter is used, that is a VAMCF according to the invention, a substantially alias free progressive output can be produced.

The alias cancelling motion compensated filter (VAMCF) used for interlace to progressive conversion requires an aperture spanning at least two fields. However, this provides no immunity from signal noise or inaccuracies in the motion vectors used. A two field filter also has the disadvantage of either a non-zero group delay, producing progressive output frames half-way between input fields, which is inconvenient, or an asymmetric aperture which may produce inferior results.

A better implementation of alias cancelling motion compensated filtering (VAMCF) for interlace to progressive conversion would use a 3 or more field aperture. This would provide a symmetric aperture with zero group delay—output frames co-timed with input fields—and some immunity from input signal noise and motion vector errors. Although 3 fields provide more information than is necessarily required for interlace to progressive conversion, mathematically an over-determined problem, the output frames can be determined as a least mean square (LMS) error approximation to all 3 input fields. This LMS approximation (described in appendix 2) provides the robust characteristics described above. In the computation of the filter characteristic to give the "best" (LMS) output frame, it is not necessary to weight the errors from all 3 fields equally. A better solution would probably be to weight the errors from the central field of the aperture twice as heavily as the two flanking fields. This weighted LMS approach to filter design is described in appendix 2.

Obviously it is possible to implement a VAMCF with more than three fields in its aperture. As the number of input fields increases, immunity to input noise and motion vector errors increases, but so does hardware complexity and the assumption of constant motion, implicit in motion compensation, across many fields is more likely to be violated. In practice a good compromise is probably to use a 3 or 5 field filter.

EXAMPLE 2

Video to Film Conversion

It is sometimes desirable to be able to convert a video signal for recording onto film (tele-recording). This might be done for archive purposes or for inserting a video sequence, perhaps with special effects, into a motion picture film.

A 50 fields/second video sequence could be recorded onto 25 frame/second film simply by recording 2 fields on each frame. Similarly 60 fields/second video could be recorded on to 30 frame/second film. However, recovering the original two fields from the recorded film frame would be very difficult because of registration problems and spatial distortions in both the optical recording and playback (telecine) operations. If the separate fields were confused in the replayed signal, as is likely, highly disturbing impairments would result in moving scenes. Even if the fields could be recovered correctly from the recorded film, motion rendition of paired fields would probably be unacceptable when the film was displayed using an optical projector.

To avoid the problems of recording paired fields it is necessary to convert interlaced signals to a progressive format. Single progressive frames can then be recorded on each film frame. This technique avoids the problems associated with recording paired fields described above. The interlace to progressive conversion process for tele-recording can be performed in exactly the same way as for video compression (example 1 above) using VAMCF to provide improved quality. The only difference with tele-recording is that, for example given a 50 Hz interlaced source, only a 25 Hz, rather than 50 Hz, progressive output is required for tele-recording.

It is probably also worth noting that video graphic post production systems often perform best with a progressively scanned input. This progressive input can be also obtained using a VAMCF, as described above, to give improved quality.

EXAMPLE 3

Motion Compensated Colour Decoding

Figure 5:
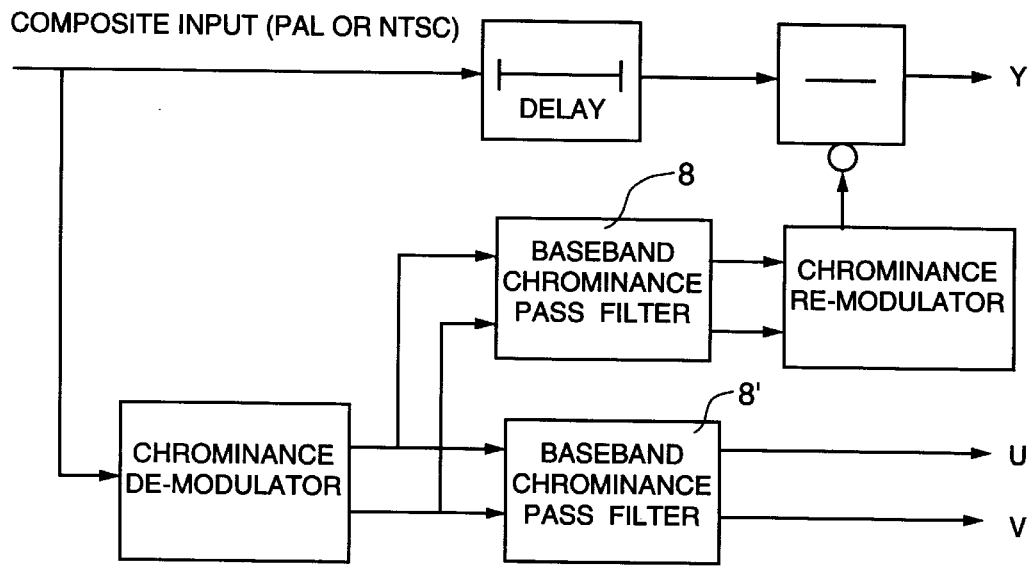
FIG. 5 is a block diagram of a composite video decoder.

Many techniques are described in the literature for decoding composite colour television signals (PAL and NTSC). One of these variations is shown in FIG. 5.

This configuration contains two, different, baseband chrominance pass filters 8 and 8'. The chrominance pass filters can be 1 dimensional (horizontal), 2 dimensional (spatial) or 3 dimensional (spatio-temporal) filters. Multi-dimensional linear filters are usually referred to as 'comb filters' in the context of colour decoding.

The comb filters in a colour decoding circuit can be replaced by conventional motion compensated spatio-temporal, comb filters. This would produce a motion compensated colour decoder. This might provide improved performance over a non-motion compensated comb filter decoder. Unfortunately the output of the motion compensated comb filters would still include alias components which would impair chrominance/luminance separation. If instead a VAMCF was used to replace the comb filters in FIG. 5, aliasing at the output of filters would be reduced, resulting in improved luminance/chrominance separation. The filter coefficients for such a filter would be designed to take account of both the magnitude and phase of the demodulated, composite signal, but a VAMCF would still be required to avoid aliasing in the filter output.

EXAMPLE 4

Motion Estimation using Interlaced Video Signals

In many techniques for video motion estimation (references 1, 2, 3, 9, 11, 13, 4,19 & 21), it is necessary to compare displaced versions of input pictures to test the validity of a possible motion vector. Typically, the current input picture is subtracted from a displaced version of the preceding or subsequent picture of a sequence. Unfortunately, if the input is an interlaced sequence, the displaced field difference signal contains significant energy due to aliasing implicit in the interlaced signal. This alias energy cannot be removed by intrafield filtering prior to motion estimation. Aliased energy can confuse a motion estimator, causing it to generate erroneous motion vectors with deleterious effects to down stream processing using the motion vectors.

By using alias cancelling motion compensated filtering (VAMCF), substantially alias free displaced field difference signals can be generated for use in motion estimation. This affords improved motion estimation by reducing the chance of the motion estimator being confused by aliasing. In order to generate alias cancelled displaced field difference signals it is necessary to use at least three fields rather than the usual 2.

A conventional forward, or backward, field difference signal is generated by a conventional motion compensated filter with a 2 field aperture. The aperture used is a field difference, that is a temporal high pass filter, and may include spatial, intra-field, interpolation. The motion vector used is the vector under test. This process could, alternatively, be considered as first calculating the mean of the two fields and then subtracting the mean field from each of the two input fields. This gives 2, identical, error signals. If the fields were progressively scanned, rather than being interlaced, the mean field would be a least mean square (LMS) best fit to the two input fields.

To generate an alias cancelled field difference, conceptually one first calculates a LMS estimate of a progressive frame from 3 or more input fields. Next a displaced field difference signal can be calculated from that progressive frame, for each of the input fields in the aperture.

Figure 6:
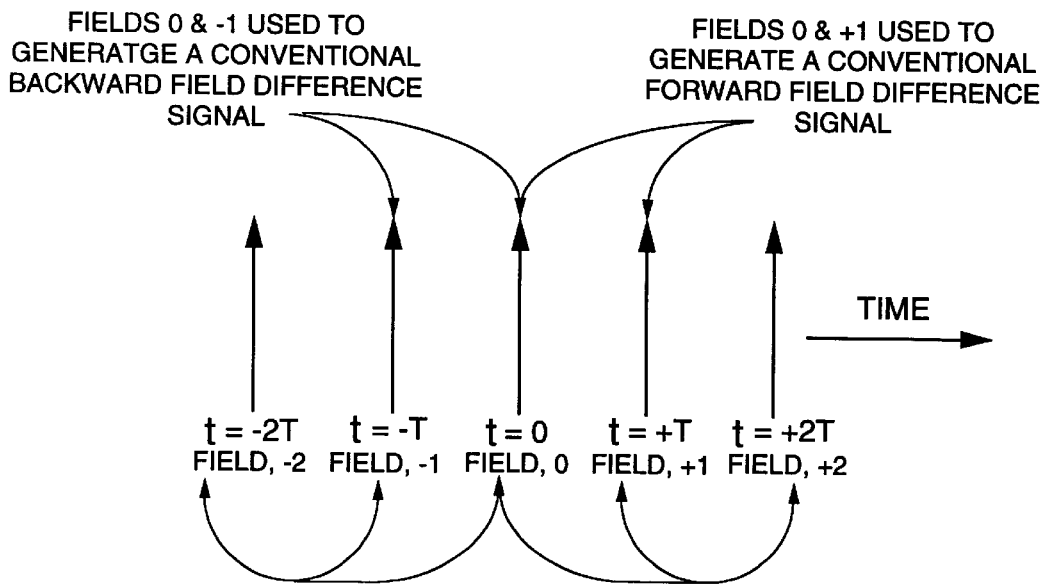
FIG. 6 is a schematic of field timing for calculating field difference signals.

Typically one might use 3 fields (i.e. fields 0, 1 and 2, and 0, −1, −2, are used to generate alias cancelled forward and backward field difference signals respectively, as illustrated in FIG. 6), although more fields, but not less, are possible. Fields 0, −1 and 0, +1 are used to generate a conventional forward and backward field difference signal respectively. With a 3 field aperture, 3 distinct field difference signals can be calculated rather than the single, unique displaced field difference of the conventional approach. Any one of these field differences could be used in place of the conventional displaced field difference. Alternatively the multiple field differences, provided by the alias cancelling approach, could be combined together, for example by taking sum of squares. to provide a more useful measure of the validity of a vector than could be obtained using the single field difference alone.

The calculation of alias cancelled field differences can be implemented using VAMCF as described earlier. To calculate each field difference requires a separate, spatio-temporal, filter. The filter design technique for this application is outlined in the appendix 2.

EXAMPLE 5

Television Standards Conversion

Television standards conversion is the process of converting between different television standards, for example between 625 line 50 Hz PAL and 525 line 60 Hz NTSC. Assuming colour decoding and re-encoding are performed separately, standards conversion is a 3 dimensional, spatio-temporal, interpolation problem. The theory and techniques of standards conversion are described in detail in references 3, 6 & 7. Motion compensation has been shown to provide improved quality compared to non-motion compensated standards conversion. Conventional MCF, however, still leaves some aliasing in the output pictures with consequent degradation to picture quality. This degradation would be particularly evident for slowly moving, high resolution images such as computer graphics. These sort of pictures could be processed admirably using motion compensation were it not for this residual aliasing.

VAMCF can be directly applied to television standards conversion. In this application removing aliasing results in a direct improvement in picture quality. Standards conversion includes a temporal interpolation process. It is necessary to generate output fields at different times from the input fields. This is in contrast to the filter examples presented above where output fields are co-timed with the input fields. The design of filter coefficients for temporal interpolation is more complex than for filtering and is outlined in appendix 2.

EXAMPLE 6

Slow Motion Displays

It is often desirable to replay a video signal more slowly than the original action. A common example of this is 'action replays' in television sports coverage. One way to achieve this is to simply repeat fields or frames as necessary to provide a sufficient picture rate. This technique is commonly used in video recorders to achieve slow motion replay. Unfortunately it results in an unnatural and disturbing 'jerky' motion rendition. Motion compensation can be used to provide improved motion rendition as described in reference 18. Conventional motion compensation, however, leaves residual aliasing in the output signal. In a slow motion replay system, aliasing from vertical detail, for example the top edge of a wall, can result in wobbling detail on an otherwise stationary image. This can be visually very disturbing.

VAMCF can be used for motion compensated slow motion replay in the same way as for television standards conversion. The theory is essentially identical but with a greater number of output fields per input field. In this case, the removal of unwanted aliasing is even more important than for standards conversion because the aliasing is more visible on the slowed down signal.

APPENDIX 1

References

1. Aggarwal, J. K. & Nandhakumar, N. 1988. On the computation of motion from sequences of images—a review. Proc. IEEE, vol. 76, pp. 917–935, August 1988.
2. Bierling, M., Thoma, R. 1986. Motion compensating field interpolation using a hierarchically structured displacement estimator. Signal Processing, Volume 11, No. 4, December 1986, pp. 387–404. Elsevier Science publishers.
3. Borer, T. J., 1992. Television Standards Conversion. Ph.D. Thesis, Dept. Electronic & Electrical Engineering, University of Surrey, Guildford, Surrey, GU2 5XH, UK. October 1992.
4. Borer, T. J., Hulyer, M. G. & Parker, D. W. 1990. Motion compensated display field rate upconversion. International Broadcasting Convention, Brighton, England, September 1990. IEE Publication No. 327. ISBN 0 85296000
5. Chiariglione, L., Corgnier, L. & Guglielmo, M. 1986. Pre- and post- processing in a video terminal using motion vectors. IBC. Brighton 1986.
6. Clarke, C. K. P. & Tanton, N. E. 1984. Digital standards conversion: interpolation theory and aperture synthesis. BBC Research Department Report 1984/20.
7. Clarke, C. K. P., 1990. Interpolation. Digital television, Sandbank, C. P. (Editor), John Wiley & Sons Ltd. 1990. ISBN 0 471 92360 5, pp. 287–374.
8. Crochiere, R. E. & Rabiner, L. R. 1983. Multirate Digital Signal Processing. Prentice Hall, Inc., Englewood Cliffs, N.J. 07632, USA. ISBN—13- 605162-6
9. Dubois, E., Konrad, J., 1990. Review of techniques for motion estimation and motion compensation. Forth international colloquium on advanced television systems, Ottawa, Canada, June 1990.
10. Girod, B. & Thoma, R. 1985. Motion-compensating field interpolation from interlaced and non-interlaced grids. 2nd international technical symposium on optical and electro-optical science and engineering: Image processing symposium, Cannes, December 1985.
11. Huange, T. S., Tsai, R. Y., 1981. Image sequence analysis: Motion estimation. Image sequence analysis, T. S. Huange (editor), Spnnge-Verlag, Berlin, Germany, 1981, pp. 1–18.
12. Marcozzi, E. & Tubaro, S. 1987. Motion compensated interpolation. SPIE, Vol. 804, Advances in image processing, pp 61–68.
13. Martinez, D. M. 1987. Model-based motion estimation and its application to restoration and interpolation of motion pictures. RLE Technical Report No.530.June 1987. Research Laboratory of Electronics, Massachusetts Institute of Technology, Cambridge, Mass. 02139 USA.
14. Netravali , A. N. , Robbins, J. D. 1979. Motion compensated television coding, Part 1. Bell Syst. Tech. J., vol. 58, pp 631–670, March 1979.
15. Parks, T. W. & Burrus, C. s. 1987. Digital Filter Design. John Wiley & Sons 1987, ISBN 0-471-82896-3.
16. Reuter, T. 1989. Standards conversion using motion compensation. Signal processing 16, 1989, pp 73–82.
17. Thoma, R. & Bierling, M. 1989. Motion compensated interpolation considering covered and uncovered background.
18. Thomas, G. A., & Lau, H. Y. K. 1990. Generation of high quality slow-motion replay using motion compensation. International Broadcasting Convention, Brighton, England. lEE Publication No. 327. ISBN 0 85296000.
19. Thomas, G. A., 1987. Television motion estimation for DAThI and other applications. BBC Research Department report No. 1987/11. September 1987.
20. Thomas, G. A., 1988. Distorting the time axis: Motion compensated image processing in the studio. International Broadcasting Convention, Brighton, England. September 1988. Published by lEE ISBN 0 85296368 8.
21. Vega-riveros, J. F., Jabbour, K. 1986. Review of motion analysis techniques. IEE Proceedings, Vol. 136, Pt I., No. 6, December 1989.

APPENDIX 2

For simplicity this appendix only considers the vertical and temporal dimensions. Extension to include the horizontal dimension is straight forward for those skilled in the art.

Consider an object, denoted h, moving with a velocity, v, to produce a moving image, denoted g.

$$g(y,t)=h(y-v \cdot t) \qquad \text{Equation 1}$$

In a television system the continuous, spatio-temporal, image g is sampled on an interlaced sampling lattice. The spatial position of the sampling grid alternates between odd and even positions on consecutive fields. Two sampled signals, S, are possible for each field position depending on whether the image, g, is sampled with an even or odd field lattice. This results in two distinct possible signals for each field denoted $S_e$ and $S_o$. Taking the Fourier transform of an even or odd sampled signal gives the following result.

$$S_e(n, t) = \mathcal{F}_y(s_e(y, t)) \quad \text{Equation 2}$$
$$= H(n) \cdot \exp(-j2\pi nvt) +$$
$$H\left(n - \frac{1}{2 \cdot Y}\right) \exp\left(-j2\pi\left(n - \frac{1}{2 \cdot Y}\right)vt\right)$$
$$S_o(n, t) = \mathcal{F}_y(s_o(y, t))$$
$$= H(n) \cdot \exp(-j2\pi nvt) -$$
$$H\left(n - \frac{1}{2 \cdot Y}\right) \exp\left(-j2\pi\left(n - \frac{1}{2 \cdot Y}\right)vt\right)$$

In these equations n represents vertical frequency, script F (subscript y) represents a Fourier transform (with respect to y only), H is the Fourier transform (complex spectrum) of the object, h, and Y is picture line spacing (field line spacing is 2Y). The equations consider first order aliasing only and are valid for positive frequencies only(similar equations apply for negative frequencies).

Consider the example of interlace to progressive conversion using 2 input fields. Assume the two input fields are at t=0 and t=T (T is the field period) and that the first field is even and the second field odd. Taking the Fourier transforms of the two fields yields the following matrix equation.

$$\begin{bmatrix} S_e(n, t=0) \\ S_o(n, t=T) \end{bmatrix} = \quad \text{Equation 3}$$
$$\begin{bmatrix} 1 & 1 \\ \exp(-j2\pi nvT) & -\exp\left(-j2\pi\left(n - \frac{1}{2Y}\right)vT\right) \end{bmatrix} \begin{bmatrix} H(n) \\ H\left(n - \frac{1}{2Y}\right) \end{bmatrix}$$

or $$S = P \cdot H$$

Where S is a vector of the spectra of sampled fields, P is a matrix of phase factors (similar to a discrete Fourier transform matrix) and H is a vector of the object spectrum and alias spectrum.

In calculating the progressive frame from the interlaced fields we are trying to find the unsampled image at t=0 from the sampled (interlaced) fields. The unsampled image we require is h(y). By solving equation 3 we can find H(n) (and also H(n−½Y), the aliasing, which we do not require) and then h(y) by an inverse Fourier transform.

$$H = P^{-1} \cdot S \quad \text{Equation 4}$$

or $$\begin{bmatrix} H(n) \\ H\left(n - \frac{1}{2Y}\right) \end{bmatrix} = \frac{1}{1 + \exp\left(j\frac{\pi vT}{Y}\right)}$$
$$\begin{bmatrix} \exp\left(j\frac{\pi vT}{Y}\right) & \exp(j2\pi nvT) \\ 1 & -\exp(-j2\pi nvT) \end{bmatrix} \begin{bmatrix} S_e(n, t=0) \\ S_o(n, t=T) \end{bmatrix}$$

Considering the expression for H(n) only we have;

$$H(n) = \frac{\exp\left(j\frac{\pi vT}{Y}\right)}{1 + \exp\left(j\frac{\pi vT}{Y}\right)} \cdot S_e(n, t=0) + \quad \text{Equation 5}$$

$$\frac{\exp(j2\pi nvT)}{1 + \exp\left(j\frac{\pi vT}{Y}\right)} \cdot S_o(n, t=T)$$

Inverse Fourier transforming equation 5 gives;

$$h(y) = filter_0(y, v) * S_e(y, t=0) + \quad \text{Equation 6}$$
$$filter_1(y, v) * S_o(y, t=T)$$
$$= filter(y, t, v) * S(y, t)$$

Where * represents the convolution operation.

Equation 6 shows that we can find the progressive image, h(y), that we require by filtering each of the interlaced fields separately using intrafield filters and then summing the results. Summing two intrafield filters on consecutive fields can be considered as using a single spatio-temporal filter. The intra-field filters used are given by the inverse Fourier transforms of the coefficients of $S_e$ and $S_o$ in equation 5. Note that the filters in equation 6 are functions of v, the vertical motion speed.

The filters of equation 6 represent an idealised situation. The filters have infinite extent and therefore cannot be realised in practice. However, the coefficients of $S_e$ and $S_o$ in equation 5 represent the frequency domain specifications for the ideal interlace to progressive conversion filters. There are many techniques in the literature (see for example reference 15) for designing practical filters from an ideal frequency domain specification.

The performance of an interlace to progressive converter can be improved by using more than a two field aperture as discussed in the main text. Consider a 3 field aperture with fields at t=−T, 0 & +T. Equation 3 then becomes;

$$\begin{bmatrix} S_o(n, t=-T) \\ S_e(n, t=0) \\ S_o(n, t=+T) \end{bmatrix} = \quad \text{Equation 7}$$
$$\begin{bmatrix} \exp(+j2\pi nvT) & -\exp\left(+j2\pi\left(n - \frac{1}{2Y}\right)vT\right) \\ 1 & 1 \\ \exp(-j2\pi nvT) & -\exp\left(-j2\pi\left(n - \frac{1}{2Y}\right)vT\right) \end{bmatrix} \begin{bmatrix} H(n) \\ H\left(n - \frac{1}{2Y}\right) \end{bmatrix}$$

or $$S = P \cdot H$$

In this case the phase matrix is rectangular, not square, and it is no longer possible to directly invert equation 7 to find H(n). It is, however, possible to find a least mean square approximation to H(n) by solving the 'normal' equations given by;

$$P^h \cdot S = (P^h \cdot P) \tilde{H} \quad \text{Equation 8}$$

Here the symbol, $^h$, represents the Hermitian conjugate (complex conjugate of the transpose) of the matrix. The ~ above H indicates that $\tilde{H}$ is a least mean square approximation. Solving for H gives;

$$\tilde{H} = (P^h \cdot P)^{-1} \cdot P^h \cdot S \quad \text{Equation 9}$$

The LMS solution for H again gives a frequency domain specification for the aliasing cancelling filters, practical versions of which can then be calculated using many published techniques.

With a 3 field aperture, for interlace to progressive conversion, it may be appropriate to give greater prominence to the centre field in the aperture. For example it might be appropriate to weight the 2 outer odd fields half as much as the central even field. This can be done by multiplying equation 7 by an appropriate weighting matrix for example;

$$W \cdot S = W \cdot P \cdot H \qquad \text{Equation 10}$$

where $$W = \begin{pmatrix} \frac{1}{4} & 0 & 0 \\ 0 & \frac{1}{2} & 0 \\ 0 & 0 & \frac{1}{4} \end{pmatrix}$$

Equation 10 can then be solved to find a weighted least mean square solution for H;

$$\tilde{H} = ((P^h \cdot W^2 \cdot P)^{-1} \cdot (P^h W^2)) S \qquad \text{Equation 11}$$

Again practical filters can be designed from the frequency domain specifications embodied in equation 11.

The design of interpolation filters for standards conversion is similar to the design of interlace to progressive conversion filters. The process of standards conversion could be looked on as calculating a sequence of progressive frames from an interlaced input. Typically an interlaced output is required from a standards converter. This is easily achieved, conceptually, by simply spatially subsampling the progressive fields appropriately to give an interlaced signal. In practice this means that only half the number of output points need be calculated with a corresponding saving in the hardware required.

For standards conversion, in contrast to interlace to progressive conversion, output fields are required at different time instants to the input fields. The effect of this is to change the phase terms in the phase matrix P. The elements of the phase matrix are still calculated using equation 2 as before. For standards conversion the values of t used are no longer integer multiples of a field period. Other than this small change the equations above still apply. Hence filter design for standards conversion is, in essence, very similar to that for interlace to progressive conversion.

In motion estimation it is often required to test the validity of a possible motion vector by comparing consecutive fields. Unfortunately this comparison is, conventionally, complicated by the interlaced nature of video signals. Improved results are possible by correctly allowing for the interlaced nature of the video signal.

Conceptually the comparison of consecutive fields, allowing for interlace, is a two stage process. First a 3 or more field aperture is used to calculate a least mean square (LMS) estimate of a progressive frame assuming the test motion vector LS correct. Then the input fields are compared to the expected fields given that the progressive frame and motion vector are correct and allowing for interlace. The least mean square estimate of (the complex spectrum of) the progressive frame is given by equation 12.

$$\tilde{H} = (P^h \cdot P)^{-1} \cdot P^h \cdot S \qquad \text{Equation 12}$$

If the estimated spectrum, $\tilde{H}$, is correct then the input fields would be given by;

$$\tilde{S} = P \cdot \tilde{H} \qquad \text{Equation 13}$$

The differences between the actual fields, S, and the estimated fields, $\tilde{S}$, is given by;

$$S - \tilde{S} = (I - P \cdot (P^h \cdot P)^{-1} P^h) S \qquad \text{Equation 14}$$

Equation 14 gives a frequency domain specification, for an alias cancelled field difference signal, for each field in the aperture. Practical filters can then be designed from the frequency domain specifications using published techniques.

I claim:

1. A filter or interpolation device for motion compensated filtering or interpolation of interlaced video signals and comprising a plurality of filter taps, characterised in that said plurality of filter taps implement between them a filter aperture which varies depending on the vertical velocity component of the motion vector associated with each sampling site, such that different filter apertures are used for different vertical velocities.

2. A filter device according to claim 1 comprising a memory and a coefficient look-up table comprising a plurality of different coefficient sets stored in said memory, wherein the total number of different coefficient sets available is given by $2^{p+1}$, where p=the vertical velocity component of the motion vector precision in bits.

3. A filter or interpolation device as claimed in claim 1, wherein each filter tap comprises a multiplier (3) and a corresponding coefficient store (4', 6).

4. A filter device according to claim 3 comprising a plurality of different coefficient sets wherein the total number of different coefficient sets available is given by $2^{p+1}$, where p=the vertical velocity component of the motion vector precision in bits.

5. A video processing system for motion compensated filtering of interlaced video signals comprising a motion estimation device for producing motion vectors corresponding to each output sampling site, a vector processor generating a set of input coordinates for each output sampling site depending on its corresponding motion vector, a data store in memory for storing input pixel values and providing a variable delay (2), a plurality of multipliers (3) and corresponding coefficient stores (4', 6), and an adder (5) to sum the partial result from each multiplier, the multipliers multiply an input pixel value selected from the data store depending on a part of the input coordinate by a coefficient selected from the coefficient store depending on another part of the input coordinate, a filter aperture is selected depending on the vertical velocity component of the motion vector supplied by the motion estimation device.

6. A video processing system according to claim 5 wherein the coefficient store comprises a plurality of different coefficient sets, and wherein the total number of different coefficient sets available is given by $2^{p+1}$, where p=the vertical velocity component of the motion vector precision in bits.

7. A video processing method for motion compensated filtering or interpolation of interlaced video signals comprising assigning a motion vector to each output sampling site, producing a set of input coordinates, and characterised by selecting a filter aperture depending on the vertical velocity component of the motion vector associated with each sampling site, such that different filter apertures are used for different vertical velocities.

8. A video processing method for processing interlaced video signals according to claim 5 wherein the step of selecting a filter aperture selects an aperture from a number of precalculated filter apertures which number is dependent on the precision of the vertical velocity component of the motion vector.

9. A video processing method for processing interlaced video signals as claimed in claim 7, wherein the filter aperture is selected from multiple pre-calculated filter apertures depending on the vertical velocity component of each motion vector, and the method comprising selecting a coefficient from the filter aperture depending on the fractional part of each input coordinate, selecting an input pixel value depending on the integer part of each input coordinate, and multiplying each input pixel value by the correspondingly selected coefficient to produce a partial result for each output sampling site and summing the partial results.

10. A video processing method for processing interlaced video signals according to claim 6 wherein number of precalculated filter apertures is dependent on the precision of the vertical velocity component of the motion vector.

* * * * *